(12) United States Patent
Kim (10) Patent No.: US 8,379,315 B2
(45) Date of Patent: Feb. 19, 2013

(54) TELECONVERTER LENS SYSTEM AND PHOTOGRAPHING APPARATUS INCLUDING THE SAME

(75) Inventor: Jin-woo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 13/042,585

(22) Filed: Mar. 8, 2011

(65) Prior Publication Data

US 2011/0292518 A1 Dec. 1, 2011

(30) Foreign Application Priority Data

Jun. 1, 2010 (KR) .................. 10-2010-0051973

(51) Int. Cl.
*G02B 15/02* (2006.01)
(52) U.S. Cl. ......... 359/673; 359/672; 359/674; 359/675
(58) Field of Classification Search ........... 359/672–675
See application file for complete search history.

(56) References Cited

U.S. PATENT DOCUMENTS

2003/0021031 A1* 1/2003 Suzuki .................... 359/676

FOREIGN PATENT DOCUMENTS

| JP | 10-197792 A | 7/1998 |
|---|---|---|
| JP | 2003-241087 A | 8/2003 |
| JP | 2003-279855 A | 10/2003 |
| JP | 2006-084739 A | 3/2006 |

\* cited by examiner

*Primary Examiner* — Evelyn A. Lester
(74) *Attorney, Agent, or Firm* — Drinker Biddle & Reath LLP (57) ABSTRACT

A teleconverter lens system is attachable to or detachable from an object side of a main lens system and facilitates performing telephotographing. A photographing apparatus includes the teleconverter lens system. The teleconverter lens system includes: a first lens having a negative refractive power; a second lens having a positive refractive power; a third lens having a negative refractive power; and a fourth lens having a positive refractive power, wherein the first, second, third, and fourth lenses are sequentially arranged from an object side to an image side of the teleconverter lens system. The first and second lenses are cemented together, and the second lens has a meniscus shape in which a convex surface is formed on the object side of the second lens.

14 Claims, 7 Drawing Sheets

TELECONVERTER LENS SYSTEM AND PHOTOGRAPHING APPARATUS INCLUDING THE SAME

CROSS-REFERENCE TO RELATED PATENT APPLICATION

This application claims the priority benefit of Korean Patent Application No. 10-2010-0051973, filed on Jun. 1, 2010, in the Korean Intellectual Property Office, the disclosure of which is incorporated herein in its entirety by reference.

BACKGROUND

1. Field of the Invention

Embodiments relate to a teleconverter lens system that is installed at an object side of a main lens system and capable of telephotographing and a photographing apparatus including the same.

2. Description of the Related Art

In these days, imaging optical devices that convert optical images into electrical signals, such as digital still cameras including a solid state imaging device, such as a charge coupled device (CCD) or a complementary metal-oxide semiconductor (CMOS), digital cameras, or the like, are widely used.

Thus, imaging optical devices may have a high performance, such as a large number of pixels, a wide viewing angle, or the like, and be small-sized and light-weight. However, general lens systems have limitations in magnification. Thus, lens systems having various magnifications are desired to provide magnifications according to user needs. One of the lens systems having various magnifications is a teleconverter lens. However, a teleconverter lens typically has a complicated structure, and aberrations are typically increased due to an increase in magnification, and thus ambient image quality is typically lowered. Also, as a teleconverter lens is used, vignetting of an ambient ray may occur. In order to prevent vignetting, the number of lenses is typically increased. An increase in the number of lenses may cause an increase in costs. As the size of a lens system is increased, small-sized imaging optical devices may not be realized.

SUMMARY

Embodiments include a teleconverter lens system having a small size and a high zooming rate.

Embodiments also include a photographing apparatus including a teleconverter lens system having a small size and a high zooming rate that facilitates telephotographing.

According to an embodiment, a teleconverter lens system that is attachable to or detachable from an object side of a main lens system and that facilitates performing telephotographing includes: a first lens having a negative refractive power; a second lens having a positive refractive power; a third lens having a negative refractive power; and a fourth lens having a positive refractive power, wherein the first, second, third, and fourth lenses are sequentially arranged from an object side to an image side of the teleconverter lens system, the first and second lenses are cemented together, and the second lens has a meniscus shape in which a convex surface is formed on the object side of the second lens.

The teleconverter lens system may satisfy the following Expression:

$$2 \leq 4\text{Shape} \leq 4,$$

where 4Shape is $(r2+r1)/(r2-r1)$, r2 is a curvature radius of the image side surface of the fourth lens, and r1 is a curvature radius of the object side surface of the fourth lens.

The teleconverter lens system may satisfy the following Expression:

$$1 \leq D/1stY \leq 1.45,$$

where D is a total thickness of the teleconverter lens system on an optical axis and 1stY is an effective radius of the first lens.

The teleconverter lens system may satisfy the following Expression:

$$13 \leq 1vd - 2vd \leq 29,$$

where 1vd is an Abbe's number of the first lens and 2vd is an Abbe's number of the second lens.

The teleconverter lens system may satisfy the following Expression:

$$1.4 \leq TEFL/EFL \leq 1.8,$$

where TEFL is a focal length of a lens system including the main lens system and the teleconverter lens system, and EFL is an effective focal length of a lens system including only the main lens system.

The third lens and the fourth lens may be cemented to each other.

According to another embodiment, a photographing apparatus includes: a teleconverter lens system; a main lens system combined with the teleconverter lens system; and an imaging device that receives an image formed by the main lens system, wherein the teleconverter lens system includes: a first lens having a negative refractive power; a second lens having a positive refractive power; a third lens having a negative refractive power; and a fourth lens having a positive refractive power, wherein the first, second, third, and fourth lenses are sequentially arranged from an object side to an image side of the teleconverter lens system, the first and second lenses are cemented together, and the second lens has a meniscus shape in which a convex surface is formed on the object side of the second lens.

BRIEF DESCRIPTION OF THE DRAWINGS

The above and other features and advantages will become more apparent by describing in detail exemplary embodiments with reference to the attached drawings in which.

DETAILED DESCRIPTION

Embodiments will now be described more fully with reference to the accompanying drawings. Like reference numerals in the drawings denote like elements. In the drawings, the sizes of elements may be exaggerated for clarity and convenience of explanation.

Figure 1:
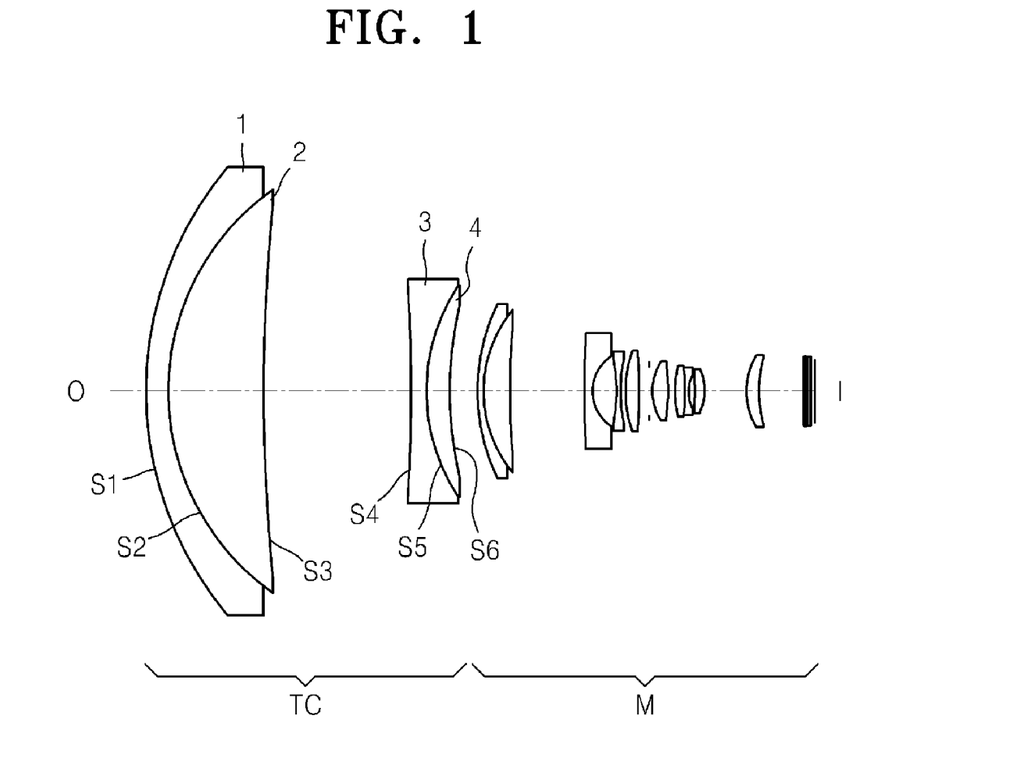
FIG. 1 is a cross-sectional view of a lens system in which a teleconverter lens system is combined with a main lens system, according to an embodiment.

FIG. 1 is a cross-sectional view of a lens system in which a teleconverter lens system TC is combined with a main lens system M, according to an embodiment. Referring to FIG. 1, the teleconverter lens system TC according to the current embodiment is attachable to or detachable from an object side O of the main lens system M. In order for telephotographing to be performed, the teleconverter lens system TC is attached to the main lens system M. In detail, the teleconverter lens system TC is installed at the object side O of the main lens system M to increase a focal length and to increase magnification. The teleconverter lens system TC may include a first lens 1 having a negative refractive power, a second lens 2 having a positive refractive power, a third lens 3 having a negative refractive power, and a fourth lens 4 having a positive refractive power. The first through fourth lenses 1, 2, 3, and 4 are sequentially arranged from the object side O to an image side I of the teleconverter lens system TC, as illustrated in FIG. 1.

The teleconverter lens system TC includes the first through fourth lenses 1, 2, 3, and 4, as described above, so that, when the teleconverter lens system TC is attached to the object side O of the main lens system M, aberrations may be properly controlled without lowering image quality, and vignetting may occur less frequently.

The first lens 1 and the second lens 2 may be cemented together. As a result, color aberration due to an increase in a focal length may be controlled. The second lens 2 may have a meniscus shape in which a convex surface is formed on the object side O thereof. Specifically, the meniscus shape may be formed according to an outer diameter of the second lens 2 in such a way that a thickness of an edge portion of the second lens 2 may be prevented from being reduced as the outer diameter of the second lens 2 is increased.

The teleconverter lens system TC may satisfy the following Expression:

$$2 \leq 4\text{Shape} \leq 4, \qquad \text{<Expression 1>}$$

where 4Shape is $(r2+r1)/(r2-r1)$, r2 is a curvature radius of the image side surface of the fourth lens 4, and r1 is a curvature radius of the object side surface of the fourth lens 4. When 4Shape is outside the range of Expression 1, the shape of the fourth lens 4 is too rapidly changed, or the shape of the fourth lens 4 is too slowly changed, and thus the fourth lens 4 may not be easily manufactured and aberrations may not be easily controlled.

The shape of the fourth lens 4 having a positive refractive power is formed as described above, and a difference between the curvature radius of the object side O and the curvature radius of the image side I may be controlled, thereby facilitating a lens manufacturing process and properly correcting aberrations.

The teleconverter lens system TC may satisfy the following Expression:

$$1 \leq D/1stY \leq 1.45, \qquad \text{<Expression 2>}$$

where D is a total thickness of the teleconverter lens system TC on an optical axis and 1stY is an effective radius of the first lens 1. When D/1stY is above the range of Expression 2, the effective radius of the teleconverter lens system TC with respect to its thickness increases and thus the teleconverter lens system TC may not be small-sized. When D/1stY is below the range of Expression 2, the effective radius of the teleconverter lens system TC with respect to its thickness decreases and thus vignetting may occur. By controlling the central thickness of the teleconverter lens system TC on the optical axis and the effective radius of the first lens 1 according to Expression 2, the teleconverter lens system TC may be small-sized.

Also, the teleconverter lens system TC may satisfy the following Expression:

$$13 \leq 1vd - 2vd \leq 29, \qquad \text{<Expression 3>}$$

where 1vd is an Abbe's number of the first lens 1 and 2vd is an Abbe's number of the second lens 2. By controlling the Abbe's number of the first lens 1 and the Abbe's number of the second lens 2, chromatic aberration may be controlled. When (1vd−2vd) is greater than the upper limit of Expression 3, costs increase, and there is a limitation in selecting a material used to form a lens. When (1vd−2vd) is less than the lower limit of Expression 3, there is difficulty in controlling aberrations.

The teleconverter lens system TC may satisfy the following Expression:

$$1.4 \leq TEFL/EFL \leq 1.8, \qquad \text{<Expression 4>}$$

where TEFL is a focal length of a lens system including the main lens system M and the teleconverter lens system TC, and EFL is a focal length of a lens system including only the main lens system M.

The third lens 3 and the fourth lens 4 may be cemented together. Thus, negative and positive doublet lenses are arranged from the object side O to the image side I. The negative and positive doublet lenses are may be separated by an air gap so that optical magnification may be increased. By constituting the teleconverter lens system TC in the manner described above, high magnification may be achieved, and brightness FNO of a lens system may be maintained. Thus, user requirements may be satisfied, and a user may have a wide range of selection for a lens system. Also, a manufacturer may manufacture a lens system having a high performance with low costs so that a profitable lens may be sold.

The teleconverter lens system TC may not include an aspherical lens.

The following describes an aspherical surface of an aspherical lens disposed in the main lens system M used in the present embodiment. When an optical axis is set as an x-axis, a direction perpendicular to the optical axis is set as a y-axis, and a direction in which a ray proceeds is set as a positive direction, an aspherical shape may be described using the following Expression:

$$x = \frac{cy^2}{1 + \sqrt{1 - (K+1)c^2 y^2}} + Ay^4 + By^6 + Cy^8 + Dy^{10}, \qquad \text{<Expression 5>}$$

where x is a distance from a vertex of a lens in an optical axis direction, y is a distance in a direction perpendicular to the optical axis, K is a conic constant, A, B, C, and D are aspherical coefficients, and c is a reciprocal (1/R) of a curvature radius at the vertex of the lens.

The teleconverter lens system TC may be realized according to embodiments with various designs. EFL represents an effective focal length, and Fno represents an F number. Unit of radius of curvature and thickness is mm. Lenses of the embodiments shown in different drawings have the same reference numerals.

<First Embodiment>

FIG. 1 illustrates a configuration in which the teleconverter lens system TC according to a first embodiment is combined with the main lens system M. The main lens system M is an example, and should not be construed as limiting.

In the current embodiment, a value of Expression 1 is 2.962, a value of Expression 2 is 1.420, a value of Expression 3 is 28.5, and a value of Expression 4 is 1.668.

EFL: 25.49 mm, FNO: 3.52, Viewing angle: 20.02°

<Lens Data>

| Lens surface | | Radius of curvature | Thickness | Refractive index (nd) | Abbe's number (vd) |
|---|---|---|---|---|---|
| Teleconverter lens system | S1 | 53.910 | 3.50 | 1.805 | 25.4 |
| | S2 | 38.200 | 14.50 | 1.713 | 53.9 |
| | S3 | 300.000 | 22.7 | | |
| | S4 | −300.000 | 2.3 | 1.743 | 49.2. |
| | S5 | 28.930 | 3.6 | 1.620 | 36.3 |
| | S6 | 58.416 | 4.30 | | |
| Main lens system | S7 | 30.553 | 0.90 | 1.923 | 20.8 |
| | S8 | 19.879 | 4.12 | 1.883 | 40.8 |
| | S9 | 149.576 | 11.35 | | |
| | S10* | 199.982 | 1.25 | 1.805 | 40.9 |
| | S11* | 6.170 | 3.8 | | |
| | S12 | −27.391 | 0.60 | 1.883 | 40.8 |
| | S13 | 27.391 | 0.78 | | |
| | S14 | 18.959 | 2.06 | 1.923 | 20.8 |
| | S15 | −79.126 | 1.56 | | |
| | Stop | infinity | 0.50 | | |
| | S17* | 8.306 | 2.40 | 1.740 | 49.0 |
| | S18* | −23.519 | 0.99 | | |
| | S19 | 15.081 | 1.6 | 1.487 | 70.4 |
| | S20 | −28.768 | 0.50 | 1.847 | 23.7 |
| | S21 | 6.998 | 0.942 | | |
| | S22 | −28.108 | 1.55 | 1.497 | 81.6 |
| | S23 | −7.455 | 8.1 | | |
| | S24* | 11.079 | 1.9 | 1.805 | 40.9 |
| | S25* | 20.770 | 5.2 | | |
| | S26 | infinity | 0.3 | 1.517 | 64.1 |
| | S27 | infinity | 0.300 | | |
| | S28 | infinity | 0.500 | 1.517 | 64.1 |
| | S29 | infinity | 0.600 | | |

In the previous table, * represents an aspherical surface, and the following table shows aspherical coefficients of the aspherical lenses.

<Aspherical Coefficients>

| Lens surface | K | A | B | C | D |
|---|---|---|---|---|---|
| S10 | 1.000000 | 5.453286E−05 | −1.446562E−06 | 1.340401E−08 | −4.558549E−11 |
| S11 | −0.252682 | 4.300082E−05 | 1.174841E−06 | −9.883407E−08 | −7.696357E−10 |
| S17 | −0.168485 | −1.546457E−04 | 2.409356E−06 | −4.319453E−08 | 0.000000E+00 |
| S18 | −0.234634 | 2.984024E−04 | 2.967020E−07 | −2.766867E−08 | 0.000000E+00 |
| S24 | 0.145844 | −7.035462E−05 | 2.048205E−06 | −2.053240E−08 | 0.000000E+00 |
| S25 | −0.912171 | −1.587416E−05 | 1.665169E−06 | −1.645959E−08 | 0.000000E+00 |

Figure 2:
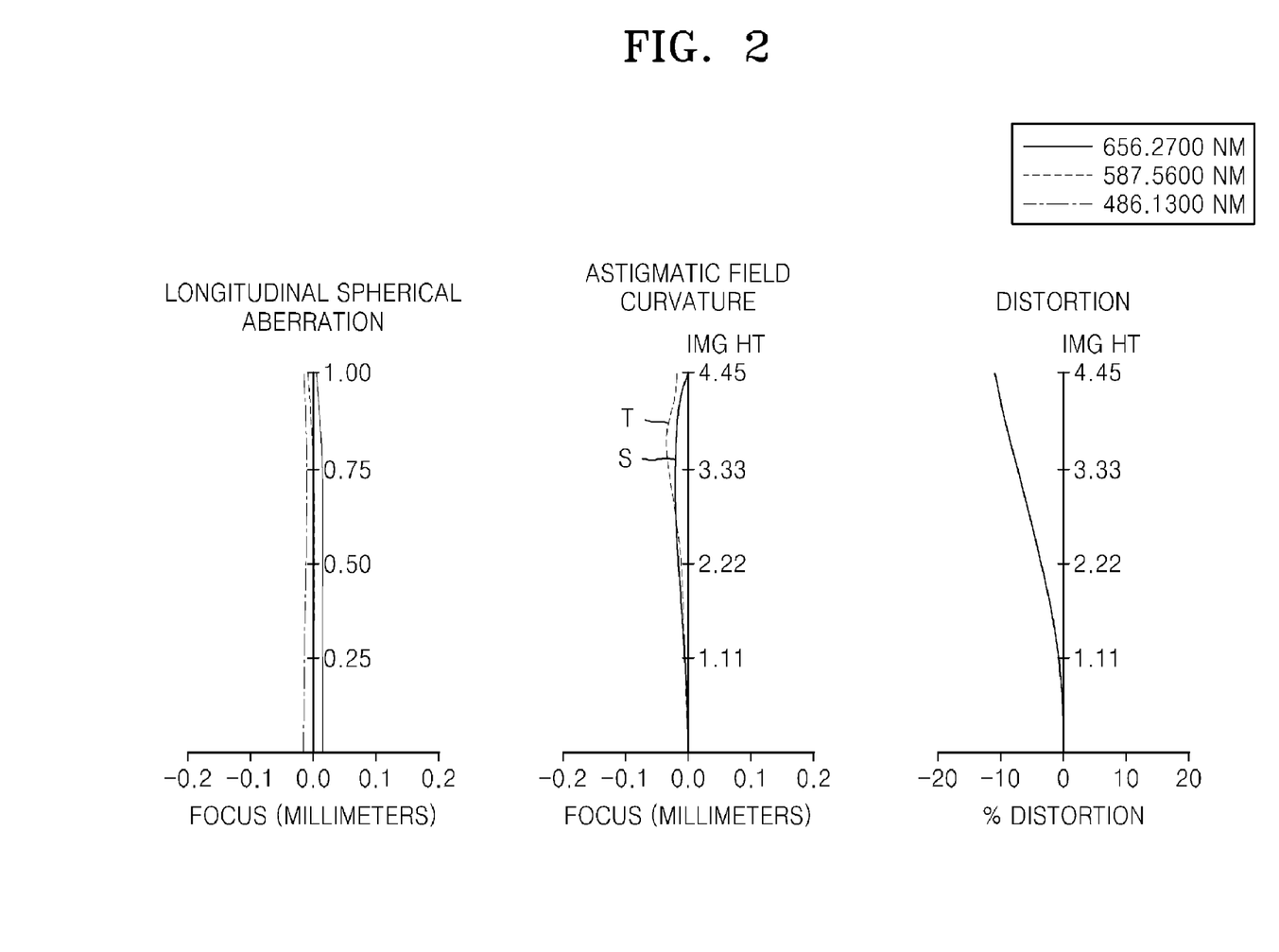
FIG. 2 shows spherical aberration, astigmatic field curvature, and distortion aberration of the teleconverter lens system illustrated in FIG. 1, according to an embodiment.

FIG. 2 shows spherical aberration, astigmatic field curvature, and distortion aberration of the teleconverter lens system TC illustrated in FIG. 1, according to an embodiment. The astigmatic field curvature includes a tangential field curve T and a sagittal field curve S. In the astigmatic field curvature and the distortion aberration, a vertical axis represents an image height IMG HT.

<Second Embodiment>

Figure 3:
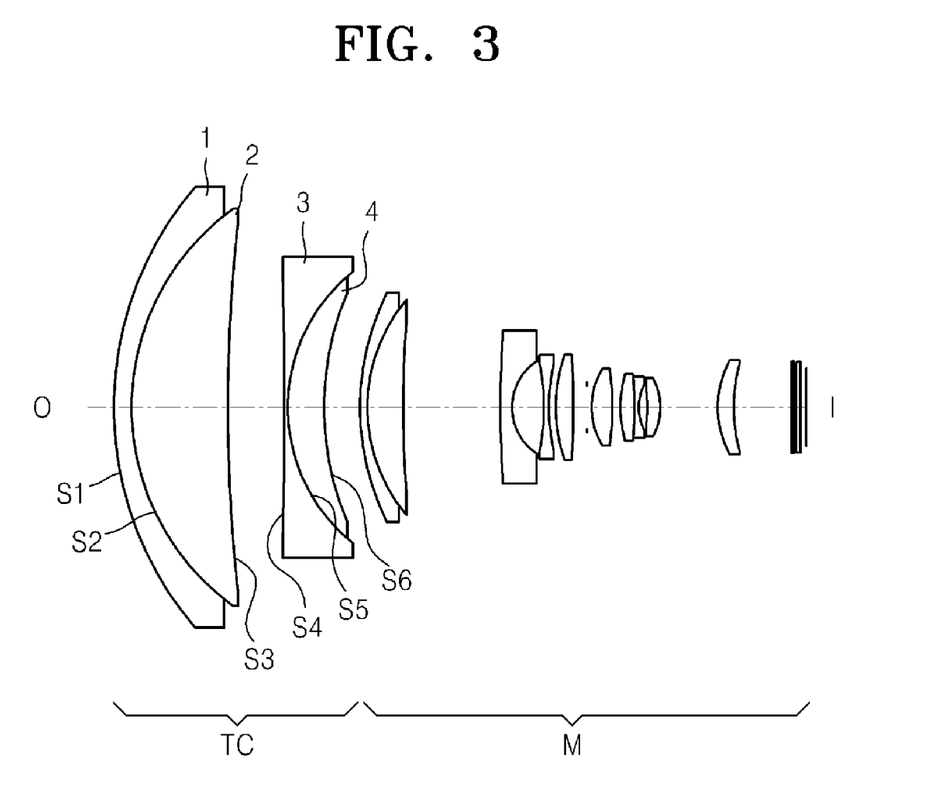
FIG. 3 is a cross-sectional view of a lens system in which a teleconverter lens system is combined with a main lens system, according to a second embodiment.

FIG. 3 is a cross-sectional view of a lens system in which a teleconverter lens system TC is combined with a main lens system M, according to a second embodiment.

In the current embodiment, a value of Expression 1 is 4.000, a value of Expression 2 is 1.000, a value of Expression 3 is 13.3, and a value of Expression 4 is 1.489.

EFL: 22.76 mm, FNO: 3.54, Viewing angle: 22.44°

<Lens Data>

| Lens surface | | Radius of curvature | Thickness | Refractive index (nd) | Abbe's number (vd) |
|---|---|---|---|---|---|
| Teleconverter lens system | S1 | 39.815 | 2.00 | 1.712 | 27.5 |
| | S2 | 28.709 | 11.16 | 1.883 | 40.8 |
| | S3 | 219.763 | 6.4 | | |
| | S4 | −1348.208 | 0.5 | 1.828 | 35.9 |
| | S5 | 20.528 | 4.2 | 1.580 | 61.4 |
| | S6 | 34.213 | 4.20 | | |
| Main lens system | S7 | 30.553 | 0.90 | 1.923 | 20.8 |
| | S8 | 19.879 | 4.12 | 1.883 | 40.8 |
| | S9 | 149.576 | 11.35 | | |
| | S10* | 199.982 | 1.25 | 1.805 | 40.9 |
| | S11* | 6.170 | 3.8 | | |
| | S12 | −27.391 | 0.60 | 1.883 | 40.8 |
| | S13 | 27.391 | 0.78 | | |
| | S14 | 18.959 | 2.06 | 1.923 | 20.8 |
| | S15 | −79.126 | 1.56 | | |
| | Stop | infinity | 0.50 | | |
| | S17* | 8.306 | 2.40 | 1.740 | 49.0 |
| | S18* | −23.519 | 0.99 | | |
| | S19 | 15.081 | 1.6 | 1.487 | 70.4 |
| | S20 | −28.768 | 0.50 | 1.847 | 23.7 |
| | S21 | 6.998 | 0.942 | | |
| | S22 | −28.108 | 1.55 | 1.497 | 81.6 |
| | S23 | −7.455 | 8.1 | | |
| | S24* | 11.079 | 1.9 | 1.805 | 40.9 |
| | S25* | 20.770 | 5.2 | | |
| | S26 | infinity | 0.3 | 1.517 | 64.1 |
| | S27 | infinity | 0.300 | | |

-continued

| Lens surface | Radius of curvature | Thickness | Refractive index (nd) | Abbe's number (vd) |
|---|---|---|---|---|
| S28 | infinity | 0.500 | 1.517 | 64.1 |
| S29 | infinity | 0.600 | | |

The following table shows aspherical coefficients of aspherical lenses used in the teleconverter lens system TC illustrated in FIG. 3.

<Aspherical Coefficients>

| Lens surface | K | A | B | C | D |
|---|---|---|---|---|---|
| S10 | 1.000000 | 5.453286E−05 | −1.446562E−06 | 1.340401E−08 | −4.558549E−11 |
| S11 | −0.252682 | 4.300082E−05 | 1.174841E−06 | −9.883407E−08 | −7.696357E−10 |
| S17 | −0.168485 | −1.546457E−04 | 2.409356E−06 | −4.319453E−08 | 0.000000E+00 |
| S18 | −0.234634 | 2.984024E−04 | 2.967020E−07 | −2.766867E−08 | 0.000000E+00 |

-continued

| Lens surface | K | A | B | C | D |
|---|---|---|---|---|---|
| S24 | 0.145844 | −7.035462E−05 | 2.048205E−06 | −2.053240E−08 | 0.000000E+00 |
| S25 | −0.912171 | −1.587416E−05 | 1.665169E−06 | −1.645959E−08 | 0.000000E+00 |

Figure 4:
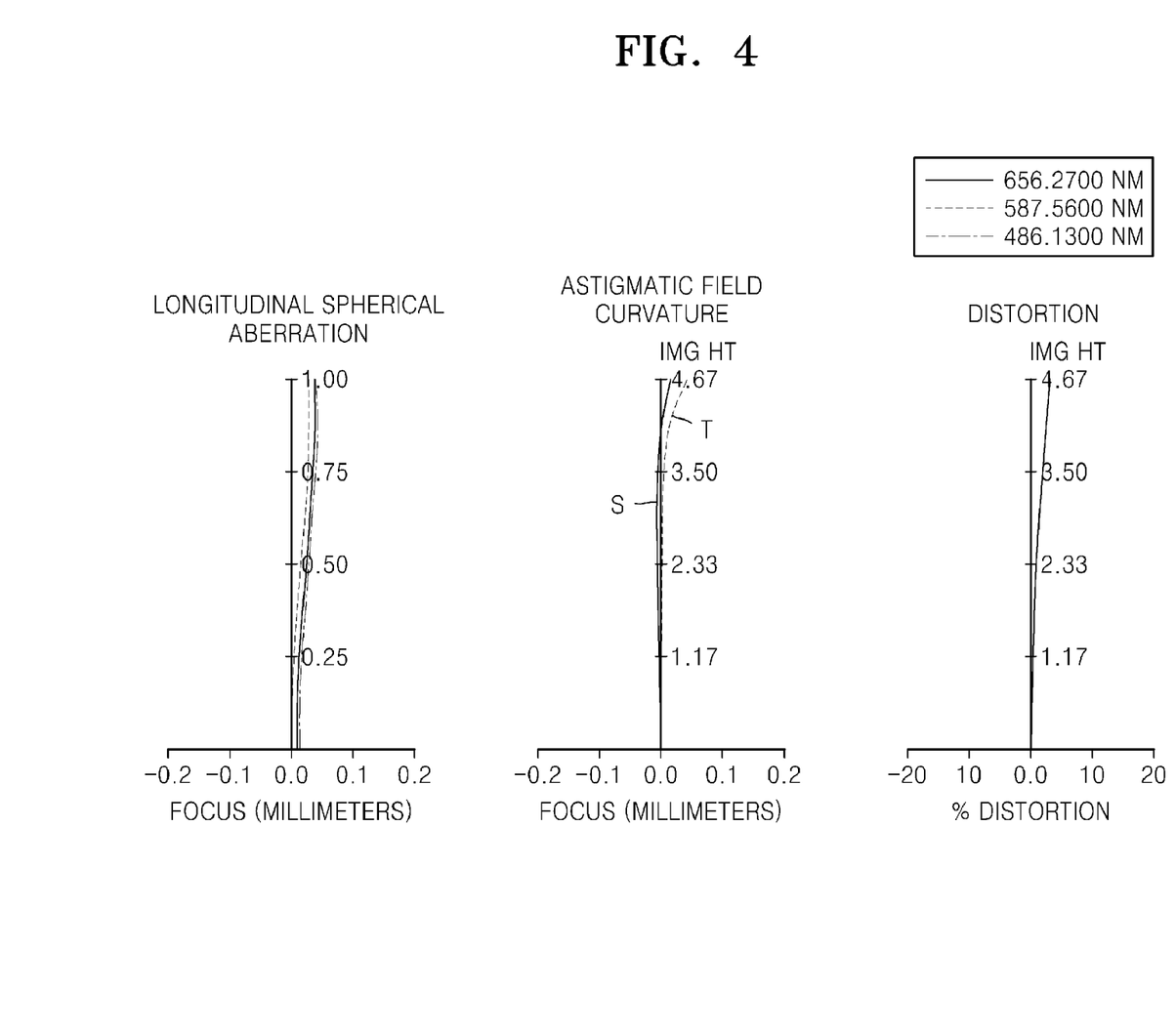
FIG. 4 shows spherical aberration, astigmatic field curvature, and distortion aberration of the teleconverter lens system illustrated in FIG. 3, according to an embodiment.

FIG. 4 shows spherical aberration, astigmatic field curvature, and distortion aberration of the teleconverter lens system TC illustrated in FIG. 3, according to an embodiment.

<Third Embodiment>

Figure 5:
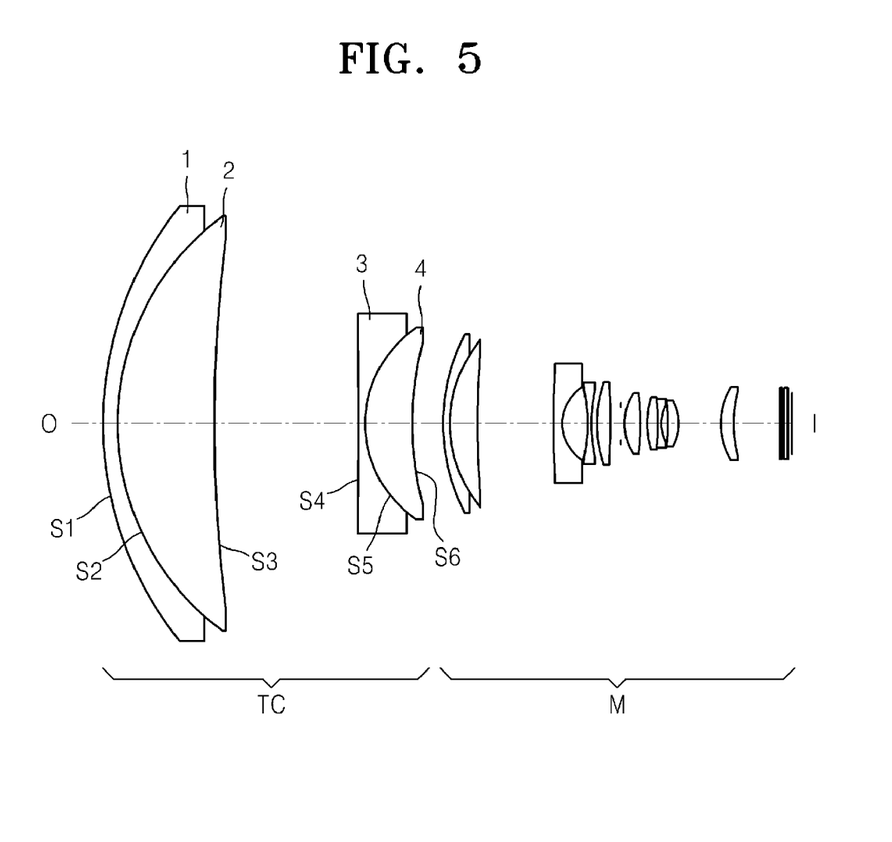
FIG. 5 is a cross-sectional view of a lens system in which a teleconverter lens system is combined with a main lens system, according to a third embodiment.

FIG. 5 is a cross-sectional view of a lens system in which a teleconverter lens system is combined with a main lens system, according to a third embodiment.

In the current embodiment, a value of Expression 1 is 2.084, a value of Expression 2 is 1.400, a value of Expression 3 is 23.9, and a value of Expression 4 is 1.701.

EFL: 26.00 mm, FNO: 3.54, Viewing angle: 19.64°

<Lens Data>

| | Lens surface | Radius of curvature | Thickness | Refractive index (nd) | Abbe's number (vd) |
|---|---|---|---|---|---|
| Teleconverter lens system | S1 | 52.895 | 2.00 | 1.923 | 20.8 |
| | S2 | 38.717 | 14.50 | 1.777 | 44.7 |
| | S3 | 257.093 | 21.4 | | |
| | S4 | −810.442 | 1.0 | 1.823 | 29.6 |
| | S5 | 17.331 | 6.9 | 1.798 | 23.9 |
| | S6 | 49.301 | 4.70 | | |
| Main lens system | S7 | 30.553 | 0.90 | 1.923 | 20.8 |
| | S8 | 19.879 | 4.12 | 1.883 | 40.8 |
| | S9 | 149.576 | 11.35 | | |
| | S10* | 199.982 | 1.25 | 1.805 | 40.9 |
| | S11* | 6.170 | 3.8 | | |
| | S12 | −27.391 | 0.60 | 1.883 | 40.8 |
| | S13 | 27.391 | 0.78 | | |
| | S14 | 18.959 | 2.06 | 1.923 | 20.8 |
| | S15 | −79.126 | 1.56 | | |
| | Stop | infinity | 0.50 | | |
| | S17* | 8.306 | 2.40 | 1.740 | 49.0 |
| | S18* | −23.519 | 0.99 | | |
| | S19 | 15.081 | 1.6 | 1.487 | 70.4 |
| | S20 | −28.768 | 0.50 | 1.847 | 23.7 |
| | S21 | 6.998 | 0.942 | | |
| | S22 | −28.108 | 1.55 | 1.497 | 81.6 |
| | S23 | −7.455 | 8.1 | | |
| | S24* | 11.079 | 1.9 | 1.805 | 40.9 |
| | S25* | 20.770 | 5.2 | | |
| | S26 | infinity | 0.3 | 1.517 | 64.1 |
| | S27 | infinity | 0.300 | | |
| | S28 | infinity | 0.500 | 1.517 | 64.1 |
| | S29 | infinity | 0.600 | | |

The following table shows aspherical coefficients of aspherical lenses used in the teleconverter lens system TC illustrated in FIG. 5.

<Aspherical Coefficients>

| Lens surface | K | A | B | C | D |
|---|---|---|---|---|---|
| S10 | 1.000000 | 5.453286E−05 | −1.446562E−06 | 1.340401E−08 | −4.558549E−11 |
| S11 | −0.252682 | 4.300082E−05 | 1.174841E−06 | −9.883407E−08 | −7.696357E−10 |
| S17 | −0.168485 | −1.546457E−04 | 2.409356E−06 | −4.319453E−08 | 0.000000E+00 |
| S18 | −0.234634 | 2.984024E−04 | 2.967020E−07 | −2.766867E−08 | 0.000000E+00 |
| S24 | 0.145844 | −7.035462E−05 | 2.048205E−06 | −2.053240E−08 | 0.000000E+00 |
| S25 | −0.912171 | −1.587416E−05 | 1.665169E−06 | −1.645959E−08 | 0.000000E+00 |

Figure 6:
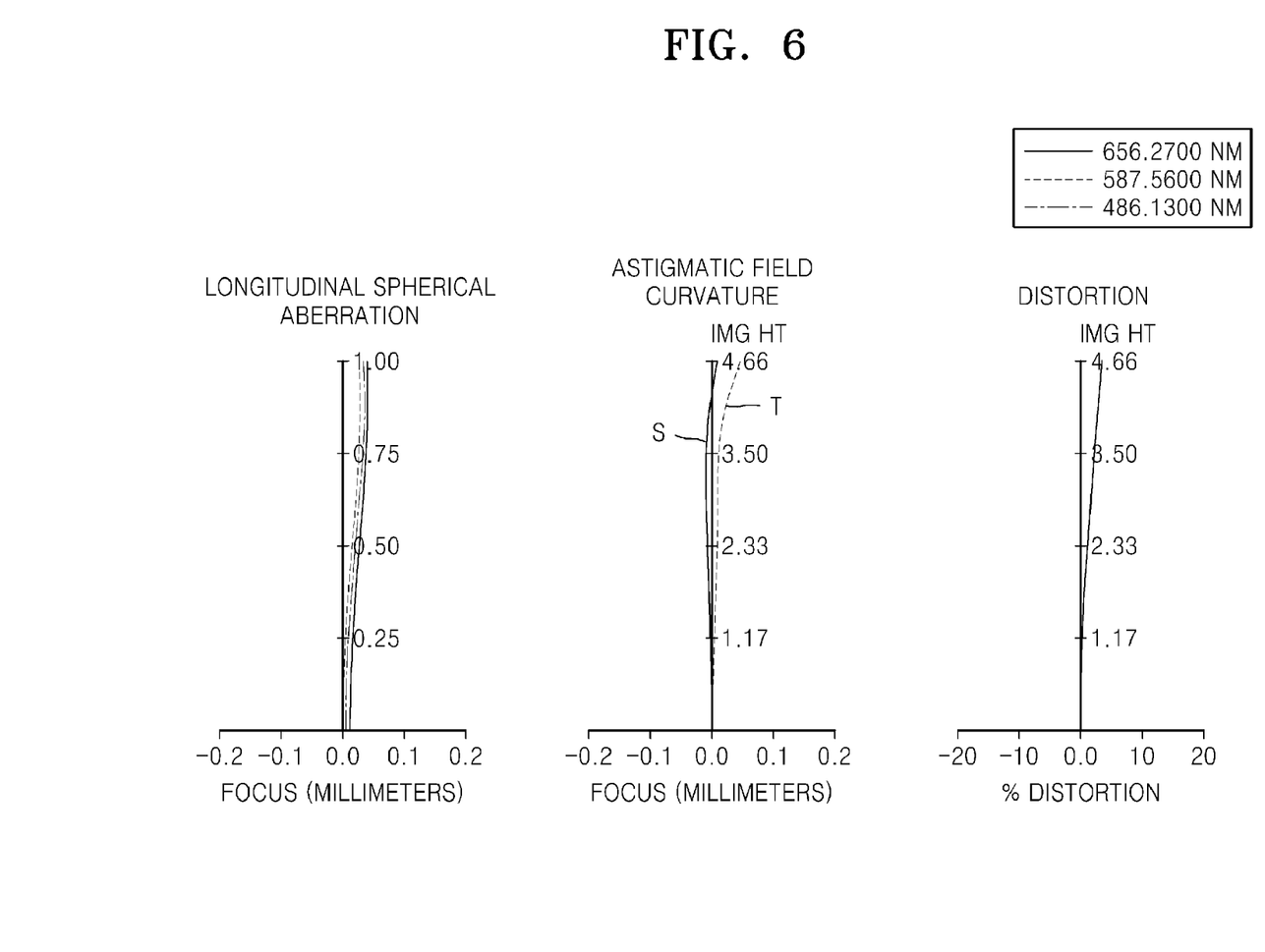
FIG. 6 shows spherical aberration, astigmatic field curvature, and distortion aberration of the teleconverter lens system illustrated in FIG. 5, according to an embodiment.

FIG. 6 shows spherical aberration, astigmatic field curvature, and distortion aberration of the teleconverter lens system TC illustrated in FIG. 5, according to an embodiment.

The following table shows that the first through third embodiments satisfy conditions of Expressions 1 through 4.

| Expression | First embodiment | Second embodiment | Third embodiment |
|---|---|---|---|
| (Expression 1) $2 \leq 4\text{Shape} \leq 4$ | 2.962 | 4.000 | 2.084 |
| (Expression 2) $1 \leq D/1stY \leq 1.45$ | 1.420 | 1.000 | 1.400 |
| (Expression 3) $13 < 1vd-2vd < 29$ | 28.5 | 13.3 | 23.9 |
| (Expression 4) $1.4 \leq TEFL/EFLD \leq 1.8$ | 1.668 | 1.489 | 1.701 |

As described above, in the teleconverter lens system TC according to one of the embodiments described above, lowering of ambient image quality or vignetting may be prevented, and the user may install the teleconverter lens system TC in front of the main lens system M conveniently so as to allow for photographing to be performed at a higher magnification than that of the main lens system M. Also, by reducing the number of lenses of the teleconverter lens system TC, the teleconverter lens system TC may be small-sized, and manufacturing costs thereof may be reduced. Also, the teleconverter lens system TC includes the first through fourth lenses 1, 2, 3, and 4, and the first lens 1 and the second lens 2 may be cemented together so that chromatic aberration due to an increase in a focal length may be reduced. Furthermore, the second lens 2 may have a meniscus shape in which a convex surface is formed on the object side O of the second lens 2, thereby preventing the thickness of the edge portion of the second lens 2 from being reduced as an outer diameter of the second lens 2 is increased.

The teleconverter lens system TC according to one of the embodiments described above may satisfy user requirements without lowering optical performance, such as resolving power and brightness (FNO) of the main lens system M.

Figure 7:
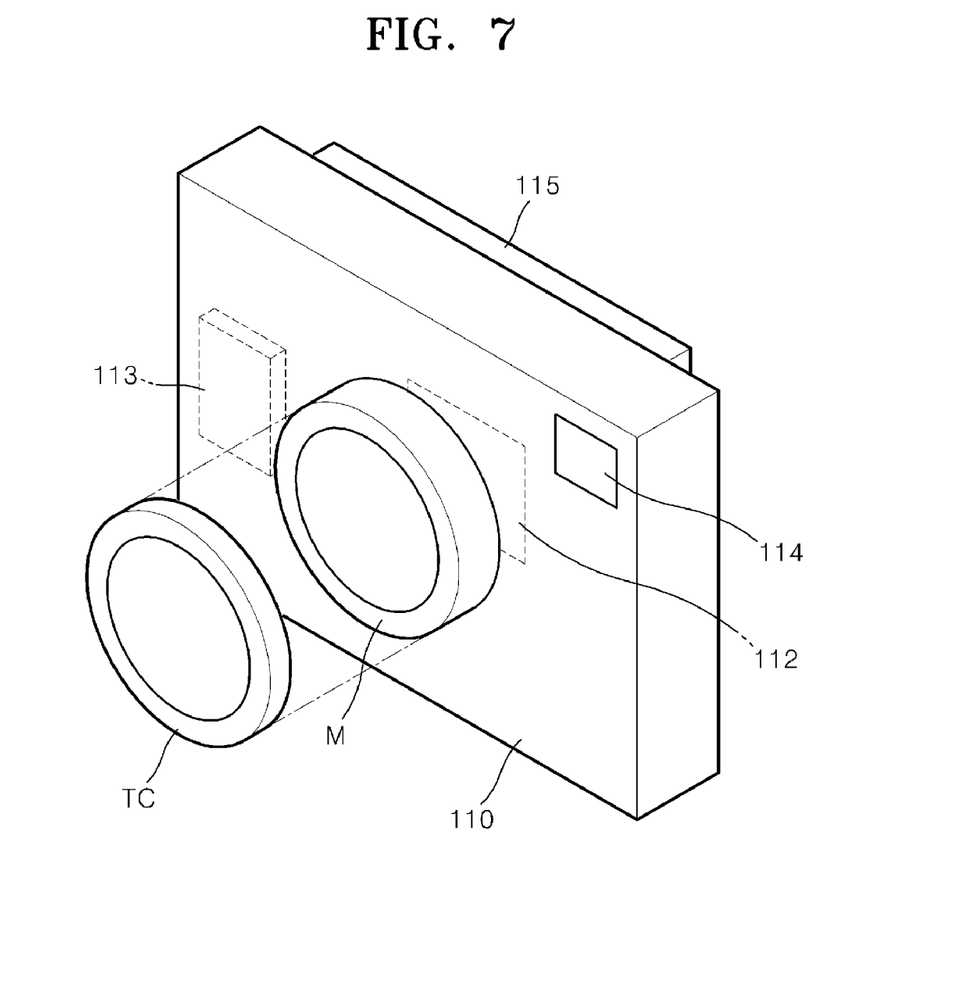
FIG. 7 illustrates a photographing apparatus including the teleconverter lens system, according to an embodiment.

FIG. 7 illustrates a photographing apparatus 110 including the teleconverter lens system TC, according to an embodiment. The photographing apparatus 110 includes the teleconverter lens system TC, which may be one of the embodiments described above, the main lens system M, and an imaging device 112 that receives light formed by the main lens system M. The photographing apparatus 110 may include a recording unit 113 in which information corresponding to an image of a subject that is photoelectrically converted by the imaging device 112 is recorded, and a view finder 114 that observes the image of the subject. A display unit 115 that may display the image of the subject may be provided. Although the view finder 114 and the display unit 115 are additionally provided, in some embodiments only an electronic finder in which a view finder and a display unit are used together without installing an additional view finder may be provided. The photographing apparatus 110 of FIG. 7 is an example, and should not be construed as limiting. Embodiments may be employed in various types of optical devices. The teleconverter lens system TC according to various embodiments may be applied to a photographing apparatus, such as a digital camera or the like, so that an optical device that is small-sized, is manufactured with low costs, has a high zooming rate, and is capable of capturing a subject may be realized.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A teleconverter lens system that is attachable to or detachable from an object side of a main lens system and that facilitates performing telephotographing, the lens system comprising:
a first lens having a negative refractive power;
a second lens having a positive refractive power;
a third lens having a negative refractive power; and
a fourth lens having a positive refractive power,
wherein the first, second, third, and fourth lenses are sequentially arranged from an object side to an image side of the teleconverter lens system,
the first and second lenses are cemented together,
the second lens has a meniscus shape in which a convex surface is formed on the object side of the second lens, and
the teleconverter lens system satisfies the following Expression:

$$2 \leq 4\text{Shape} \leq 4,$$

where 4Shape is $(r2+r1)/(r2-r1)$, r2 is the radius of curvature of the image side surface of the fourth lens, and r1 is the radius of curvature of the object side surface of the fourth lens.

2. The lens system of claim 1, wherein the teleconverter lens system satisfies the following Expression:

$$1 \leq D/1stY \leq 1.45$$

where D is a total thickness of the teleconverter lens system on an optical axis and 1stY is an effective radius of the first lens.

3. The lens system of claim 1, wherein the teleconverter lens system satisfies the following Expression:

$$13 \leq 1vd - 2vd \leq 29,$$

where 1vd is an Abbe's number of the first lens and 2vd is an Abbe's number of the second lens.

4. The lens system of claim 1, wherein the teleconverter lens system satisfies the following Expression:

$$1.4 \leq TEFL/EFL \leq 1.8,$$

where TEFL is a focal length of a lens system including the main lens system and the teleconverter lens system, and EFL is an effective focal length of a lens system including only the main lens system.

5. The lens system of claim 1, where the third lens and the fourth lens are cemented to each other.

6. A photographing apparatus comprising:
a teleconverter lens system;
a main lens system combined with the teleconverter lens system; and
an imaging device that receives an image formed by the main lens system,
wherein the teleconverter lens system comprises:
a first lens having a negative refractive power;
a second lens having a positive refractive power;
a third lens having a negative refractive power; and
a fourth lens having a positive refractive power,
wherein the first, second, third, and fourth lenses are sequentially arranged from an object side to an image side of the teleconverter lens system,
the first and second lenses are cemented together,
the second lens has a meniscus shape in which a convex surface is formed on the object side of the second lens, and
the teleconverter lens system satisfies the following Expression:

$$2 \leq 4\text{Shape} \leq 4,$$

where 4Shape is $(r2+r1)/(r2-r1)$, r2 is the radius of curvature of the image side surface of the fourth lens, and r1 is the radius of curvature of the object side surface of the fourth lens.

7. The lens system of claim 6, wherein the teleconverter lens system satisfies the following Expression:

$$1 \leq D/1stY \leq 1.45,$$

where D is a total thickness of the teleconverter lens system on an optical axis and 1stY is an effective radius of the first lens.

8. The lens system of claim 6, wherein the teleconverter lens system satisfies the following Expression:

$$13 \leq 1vd - 2vd \leq 29,$$

where 1vd is an Abbe's number of the first lens and 2vd is an Abbe's number of the second lens.

9. The lens system of claim 6, wherein the teleconverter lens system satisfies the following Expression:

$$4 \leq TEFL/EFL \leq 1.8,$$

where TEFL is a focal length of a lens system including the main lens system and the teleconverter lens system, and EFL is an effective focal length of a lens system including only the main lens system.

10. The lens system of claim 6, where the third lens and the fourth lens are cemented to each other.

11. A teleconverter lens system that is attachable to or detachable from an object side of a main lens system and that facilitates performing telephotographing, the lens system having no more than four lenses, the lens system comprising:
a first lens having a negative refractive power;
a second lens having a positive refractive power;
a third lens having a negative refractive power; and
a fourth lens having a positive refractive power,
wherein the first, second, third, and fourth lenses are sequentially arranged from an object side to an image side of the teleconverter lens system,
the first and second lenses are cemented together, and the second lens has a meniscus shape in which a convex surface is formed on the object side of the second lens.

12. The lens system of claim 11, where the third lens and the fourth lenses are cemented to each other.

13. A photographing apparatus comprising:
a teleconverter lens system;
a main lens system combined with the teleconverter lens system; and
an imaging device that receives an image formed by the main lens system,
wherein the teleconverter lens system has no more than four lenses, the teleconverter lens system comprising:
a first lens having a negative refractive power;
a second lens having a positive refractive power;
a third lens having a negative refractive power; and
a fourth lens having a positive refractive power,
wherein the first, second, third, and fourth lenses are sequentially arranged from an object side to an image side of the teleconverter lens system,
the first and second lenses are cemented together, and the second lens has a meniscus shape in which a convex surface is formed on the object side of the second lens.

14. The photographing apparatus of claim 13, where the third lens and the fourth lenses of the teleconverter lens system are cemented to each other.

* * * * *